US00RE48245E

(19) United States
(12) Reissued Patent
Wilson et al.

(10) Patent Number: US RE48,245 E
(45) Date of Reissued Patent: Oct. 6, 2020

(54) MOBILE UVA CURING SYSTEM AND METHOD FOR COLLISION AND COSMETIC REPAIR OF VEHICLES

(71) Applicant: SPDI, INC., Delray Beach, FL (US)

(72) Inventors: John Wilson, Boynton Beach, FL (US); Robert Schenk, Lakeworth, FL (US)

(73) Assignee: SPDI, Inc., Delray Beach, FL (US)

(21) Appl. No.: 15/663,478

(22) Filed: Aug. 15, 2017

Related U.S. Patent Documents

Reissue of:
(64) Patent No.: 9,099,213
Issued: Aug. 4, 2015
Appl. No.: 14/152,891
Filed: Jan. 10, 2014

U.S. Applications:
(63) Continuation-in-part of application No. 13/973,841, filed on Aug. 22, 2013, now Pat. No. 9,035,271.

(60) Provisional application No. 61/771,168, filed on Mar. 1, 2013.

(51) Int. Cl.
*G21K 5/00* (2006.01)
*B05D 3/06* (2006.01)
*B05D 5/00* (2006.01)

(52) U.S. Cl.
CPC ..... *G21K 5/00* (2013.01); *B05D 3/067* (2013.01); *B05D 5/005* (2013.01)

(58) Field of Classification Search
CPC . G21K 5/10; G21K 5/00; B05D 3/067; B05D 5/005
USPC ..... 250/492.1, 372, 455.11, 461.1, 504 R, 250/504 H, 493.1
See application file for complete search history.

(56) References Cited

U.S. PATENT DOCUMENTS 4,019,062 A * 4/1977 Rongren ..... 250/492.1
4,864,145 A * 9/1989 Burgio, Jr. ..... 250/492.1
5,591,460 A * 1/1997 Wanstrath et al. ..... 425/12
6,468,350 B1 * 10/2002 Hillenbrand ..... B05C 9/14 118/207
6,538,258 B1 * 3/2003 Rau et al. ..... 250/504 R
(Continued)

OTHER PUBLICATIONS

ISA EPO, International Preliminary report on Patentability for International Application No. PCT/US2014/019387, dated Sep. 1, 2015.

*Primary Examiner* — Albert J Gagliardi
(74) *Attorney, Agent, or Firm* — Howard M. Gitten, Esq.; Lewis Brisbois Bisgaard & Smith LLP

(57) ABSTRACT

The present invention is directed to mobile radiation systems and methods of use that comprise a mobile UVA irradiator including a power supply, a UVA lamp, a control and system indicator unit; a UV radiation blocker nest having an adaptor opening for receiving a hand-held irradiator when said irradiator is in a seated position in said nest; and a mobile carrier comprising a first compartment for housing said power supply, hand-held irradiator, said irradiator nest, wheels and said control unit. The nest may be configured to conform to the hand-held irradiator to block irradiation from the hand-held irradiator when it is energized and in its seated position. The mobile radiation device produced UVA radiation having peak radiation wavelength in a range of from 250 nm to 450 nm and can have a peak irradiation power in a range of from 0.5 W/cm$^2$ to 10 W/cm$^2$.

15 Claims, 19 Drawing Sheets

(56) References Cited

U.S. PATENT DOCUMENTS 7,775,690 B2 * 8/2010 Wakalopulos ..... F26B 3/28 250/492.1
7,871,704 B2 * 1/2011 Thomas ..... C08G 18/672 428/411.1
7,931,859 B2 * 4/2011 Mlodzinski et al. ..... 422/24
8,158,956 B2 * 4/2012 Karunaratne ..... B05D 3/067 250/453.11
8,193,514 B2 * 6/2012 Ferraro ..... F26B 3/28 250/453.11
8,308,313 B2 * 11/2012 Wakalopulos ..... B05D 3/067 118/642
8,378,322 B2 * 2/2013 Dahm et al. ..... 250/496.1
8,748,829 B2 * 6/2014 Lipson ..... 250/365
8,929,510 B2 1/2015 Nishino
9,099,213 B2 8/2015 Wilson
2002/0158209 A1 * 10/2002 Ueno ..... B05D 3/0209 250/455.11
2003/0143404 A1 * 7/2003 Welch et al. ..... 428/412
2003/0209836 A1 * 11/2003 Sherwood ..... 264/401
2005/0095371 A1 * 5/2005 Braun ..... C05G 3/0029 427/558
2006/0099351 A1 * 5/2006 Field ..... E04F 21/24 427/487
2006/0130663 A1 * 6/2006 Joshi et al. ..... 96/224
2006/0278088 A1 * 12/2006 Helsel ..... 96/224
2008/0067418 A1 * 3/2008 Ross ..... 250/455.11
2009/0273266 A1 11/2009 Wakalopulos
2010/0130636 A1 5/2010 Karunaratne et al.
2010/0276059 A1 11/2010 Tian et al.
2011/0097481 A1 * 4/2011 Bowman ..... B05D 5/005 427/140
2011/0172810 A1 * 7/2011 Mlodzinski et al. ..... 700/230
2012/0085926 A1 * 4/2012 Ingram et al. ..... 250/454.11
2013/0187063 A1 * 7/2013 Dahm et al. ..... 250/492.1
2013/0277577 A1 * 10/2013 Lipson ..... 250/492.1
2014/0060095 A1 * 3/2014 Shur et al. ..... 62/129
2014/0246602 A1 * 9/2014 Wilson et al. ..... 250/492.1
2016/0008848 A1 * 1/2016 Larson ..... B05D 3/067 427/8

* cited by examiner

MOBILE UVA CURING SYSTEM AND METHOD FOR COLLISION AND COSMETIC REPAIR OF VEHICLES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

The present application is a continuation-in-part of and claims the benefit of priority of U.S. utility application Ser. No. 13/973,841, filed Aug. 22, 2013, and claims the benefit of priority of U.S. provisional patent application 61/771,168, filed Mar. 1, 2013.

FIELD OF DISCLOSURE

The present disclosure is directed to mobile radiation systems and methods of curing radiation curable coating compositions to form a cured coating layer, particularly in the field of collision and cosmetic repair of body parts of vehicles such as cars and trucks.

BACKGROUND OF DISCLOSURE

Various curing devices and use of radiation curable coatings and devices or systems for use in collision and cosmetic repair of body parts of vehicles such as cars and trucks are known. Conventional devices and uses typically require a combination of radiation curable coatings, such as primers, a radiation source or radiator, and a power supply. For example, systems currently available from Cure-Tek® in 400 W and 1200 W systems are large, clumsy and difficult to maneuver in a congested repair shop. Typically the curing area is small in relation to these systems, and the irradiation output is typically about 100 milli-watts at a distance of about 10 inches. In this system the lamp is stationary while curing, and must be moved from place to place in order to cure relatively large surfaces such as vehicle body panels. Also, due to the round, or circular configuration of the reflector, insufficient irradiation intensity and non-uniform curing, a "light ring" defect results in some applications.

Also, while typically, an ultraviolet (UV) source such as a UV lamp can be used for curing a UV curable coating composition, such as a paint primer, applied over a substrate to form a cured coating layer; such UV radiation from the UV lamp can be harmful for operators during the use. This problem is in addition the aforementioned deficiencies of conventional irradiators, and their poor quality, inefficient and slow irradiation times that have plagued the collision and cosmetic repair of vehicles industry.

Typically, modern primers are polymeric in nature and are dried, or cured through use of a photo-initiator. UV radiation in the range of about 200-400 nm is typically used as a photo-initiator in this industry. Conventional irradiators used in this industry are not mobile, have irradiation sources that provide point or narrow radius concentration of curing irradiation, typically UVA, are clumsy to handle, and lack control and indication information that would be useful to an operator.

In the automotive repair industry, repair of cars and trucks often require painting or repainting of various surfaces, ranging from repainting of entire panels of body parts for the vehicle to repainting relatively small areas that have suffered dents, scratched, and the like. Typically, repair of vehicles includes preparing the surface to be painted or repainted, which typically includes coating the surface with a primer in the painting booth of a body shop in order to comply with OSHA and other governmental regulations. In these uses the slow and uneven curing provided by conventional irradiators are sources of problems. Specifically, because typical, slow conventional curing times, typically about 30 minutes results from use of conventional curing irradiators. These slow cure times create bottlenecks in high volume applications because the painting booth is then tied up while the primer cures and is not available to the operators for other tasks such as sanding the cured surface in preparation for actual painting.

With the novel UV mobile curing devices described herein, improved methods of curing irradiation curable coatings are made possible, particularly in the vehicle repair industry where car and truck panel surfaces and areas that have suffered nicks, scratches or other relatively small area damage require re-painting. The basics of UV curing technology are known, as shown for example on the Internet at http://www.cureuv.com/uv-lamp-curing-technology-101.html. For the purpose of the presently described devices and methods the terms WPI, intensity, dosage, wavelength, reflector, and cooling and photo initiator are intended to have the same meaning as defined in this Internet reference. With respect to the UV curing methods described herein, UV lamps used in these methods generally produce a spectrum of radiation as is known. As is also well known, industrial curing, the intended use of the described mobile irradiator and methods herein, is conducted primarily in the range of UV-C, UV-B and near UV-A, that is, from slightly below about 200 nm to slightly above about 400 nm. The peak intensity occurs at about 365 nm, with other smaller peaks at other wavelengths. The far ultraviolet lies between 200 nm and 300 nm, and is referred to as Germicidal or UV-C. The middle ultraviolet lies between 280 nm and 320 nm and is referred to as Erythmea (suntan) or UV-B. The near ultraviolet lies between 320 and 400 nm, and is commonly called Black Light (long ultraviolet) or UV-A. Therefore, needs exist for improved irradiation system for use in collision and cosmetic repair of vehicles that successfully address these known, long-felt needs.

STATEMENT OF DISCLOSURE

To address the aforementioned problems and needs, described herein are embodiments of hand-held irradiators that are mobile, that deliver known, constant UV radiation and at predetermined distances from the surface to be cured to maximize the curing rate of the curable coating on a substrate, and that provide operator controls and system operating information. The present systems also provide shielding for operators to minimized exposure to UV and IR radiation while the irradiator is in on "ON", but stand-by condition.

Also described herein are embodiments that are adapted for high volume curing of relatively large coated surfaces, such as vehicle body panels; mobile embodiments that are adapted for curing relatively small areas of a coated surface, such as found at scratches and dents on a vehicle body; and, portable, mobile embodiments that are adapted to be transported and quickly set up for use in curing a surface have an curable surface coating.

The presently described mobile systems are also adapted and configured to provide a relatively narrow band of irradiation that extends along the length of its hand-held irradiator, with the irradiator's reflector configured to provide maximum intensity of irradiation along this narrow band. With these features incorporated into embodiments of the presently described systems a coated surface of relatively large surface, such as a vehicle body part, can be cured at about the same rate of speed of spraying primer or other coating on the surface, and with the hand-held irradiator held at about the same distance away from the surface as is the sprayer for applying the primer or other coating.

With respect to other lower power, "touch-up" embodiments, provided with a lower power ballast and lamp, and with a smaller hand-held irradiator, increased flexibility in use applications and environments is made possible.

Thus, with the presently described systems, greatly improved, faster, more reliable and efficient methods of UVA curing of curable surfaces are provided.

More specifically, one embodiment of the present invention is directed to a mobile radiation system comprising:

(a1) a mobile radiation device coupled to a control unit via one or more coupling devices;

(a2) a radiation blocker having an adaptor opening for receiving said mobile radiation device when said mobile radiation device is in a seated position on said radiation blocker;

(a3) a mobile carrier comprising a first compartment for housing said radiation blocker, a second compartment for housing said control unit, and one or more carrier motion devices;

wherein said adaptor opening dimensionally fits said mobile radiation device to block radiations from said mobile radiation device when said mobile radiation device is in said seated position on said radiation blocker.

Also, an alternate embodiment of the present invention further directed to a mobile kit for a mobile radiation system, the kit comprising:

(b1) a mobile radiation device;

(b2) a control unit;

(b3) one or more coupling devices;

(b4) a radiation blocker having an adaptor opening for receiving said mobile radiation device in a seated position on said radiation blocker;

(b5) a mobile carrier comprising a first compartment for housing said radiation blocker, a second compartment for housing said control unit, and one or more carrier motion devices;

wherein said mobile radiation device is connectable to said control unit via said one or more coupling devices;

said adaptor opening dimensionally fits said mobile radiation device to block radiations from said mobile radiation device when said mobile radiation device is received in said seated position on said radiation blocker.

DETAILED DESCRIPTION

Figure 1A:
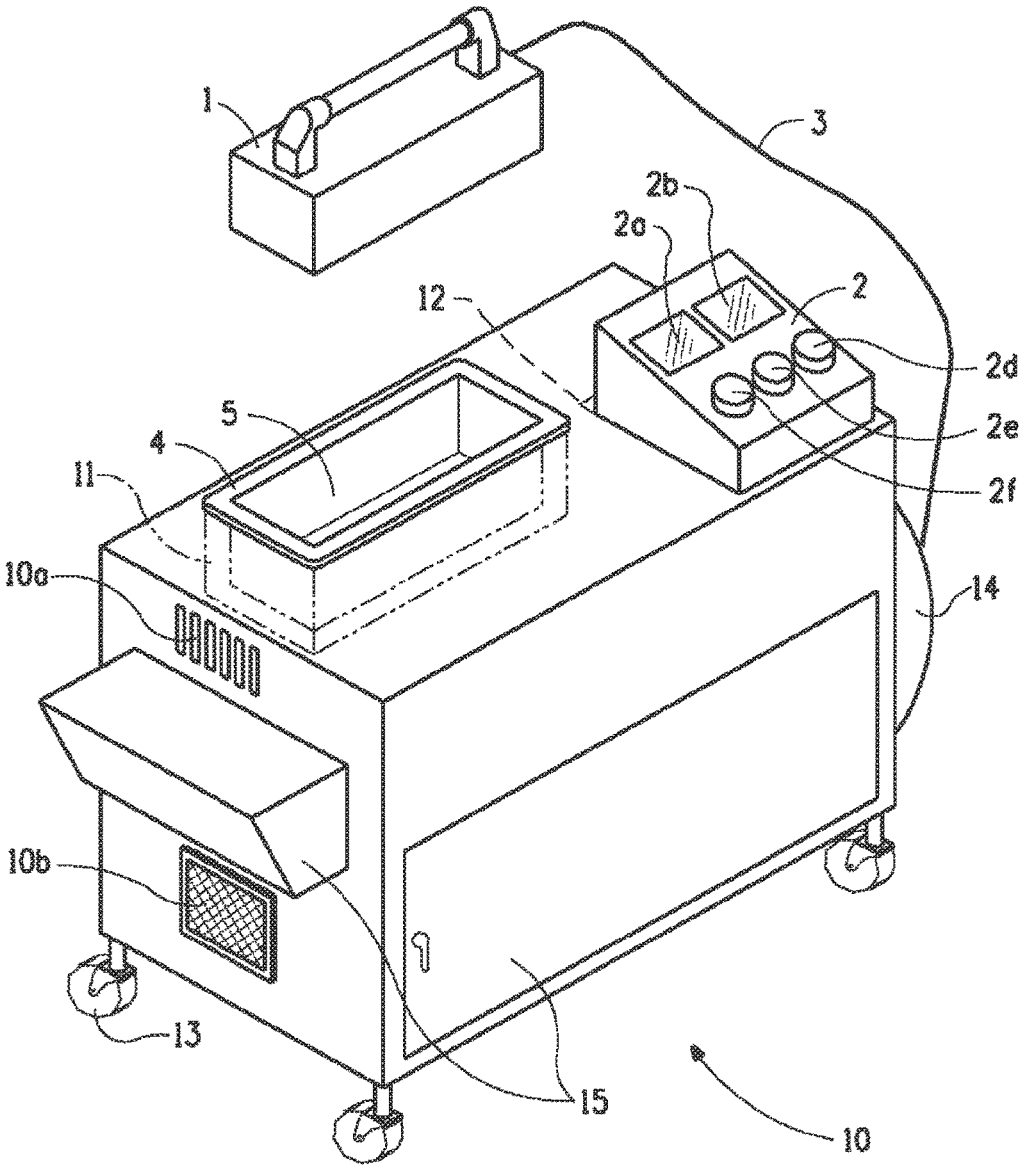
FIG. 1A is a schematic view of a preferred embodiment of the present with the radiator out of its nest and ready for us.

The features and advantages of the present system and methods will be more readily understood by those of ordinary skill in the art from reading the following detailed description. It is to be appreciated that certain features of the system and methods are, for clarity, described in the context of separate embodiments, and that features of the various embodiments may be provided in various combinations in a single embodiment or in different embodiments. Conversely, various features of the invention that are, for brevity, described in the context of a single embodiment, may also be provided separately or in sub-combination(s). In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

This disclosure is directed to a mobile radiation system 10 and to methods of curing radiation curable compositions, such as paint, paint primers and the like. A preferred embodiment of the mobile radiation device comprises:

(a1) a mobile radiation device radiator (1) coupled to a control unit (2) via one or more coupling devices (3) and a power supply;

(a2) a radiator next including a radiation blocker (4) having an adaptor opening (5) for receiving said mobile radiation device (1) when said mobile radiation device is in a seated position on said radiator (4);

(a3) a mobile carrier comprising a first compartment (11) for housing said radiator and said radiation blocker, a second compartment (12) for housing said control unit, and one or more carrier motion devices or wheels (13);

wherein said adaptor opening dimensionally fits said mobile radiation device radiator to block radiation from said, mobile radiation device when said mobile radiation device is in said seated position in said nest.

Referring to FIGS. 1-5, a preferred system includes a mobile housing or carrier 10, a radiator 1, a radiator nest or first compartment 11, a second compartment or control housing for a control unit, a power supply (not shown) and a power cord 3. FIG. 1A shows the radiator 1 out of its nest 11 and ready for use. FIG. 1B shows the radiator 1 seated in the nest 11.

Figure 2A:
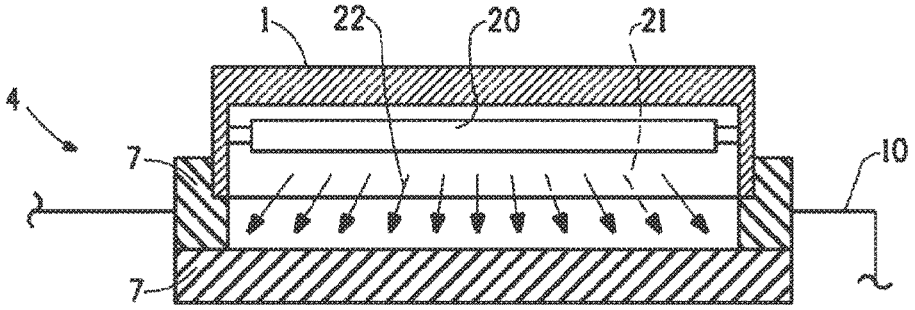
FIG. 2A is a schematic cross-sectional view a preferred radiator with a preferred radiation blocker that provides total radiation blocking elements on all sides.
Figure 2B:
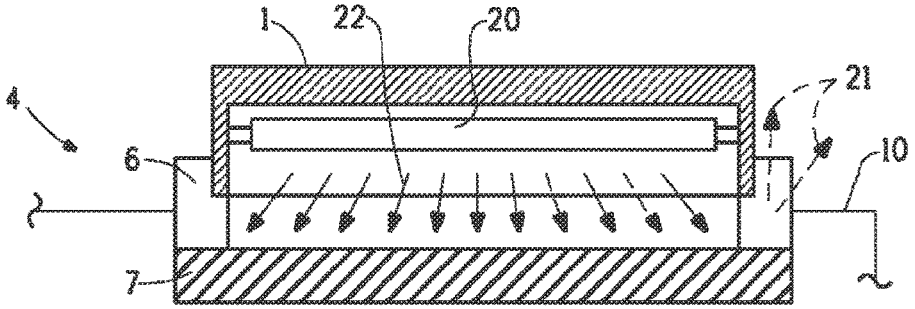
FIG. 2B is a schematic cross-sectional view the FIG. 2A radiator and with an alternate preferred a radiation blocker that has alternate UV blocking elements.
Figure 2C:
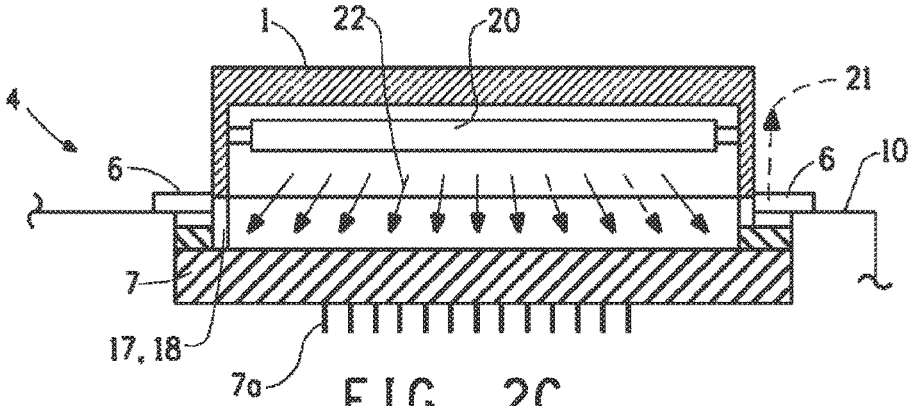
FIG. 2C is a schematic cross-sectional view a preferred radiator with an alternate preferred radiation blocker has alternate UV blocking elements.

Referring to FIGS. 2A-2C the mobile radiation system 10 includes an ultraviolet (UV) source such as a UV bulb (20), preferably a mercury UV lamp, or alternatively a UV light-emitting diode (LED), or any other UV source that can provide the desired irradiation power at the target coating. A UV power measuring device, such as a UV POWER PUCK® FLASH, available from The EIT Instrument, Sterling, Va. 20164, USA, under respective registered trademark, is preferably included to measure UV irradiation power and display the power on the control unit 2, at, for example, display 2a.

Individual controls on the control unit 2 preferably are adapted to adjust or control the UV irradiation power, duration of radiation, or a combination thereof. The irradiation power delivered to the coating to be cured is adjusted by adjusting power to the mobile radiation device, also known as the radiator, adjusting the distance between the radiator and the coating to be irradiated, the configuration of the UV reflection assembly, or a combination thereof. The control unit 2 preferably includes one or more display devices, 2a, 2b, and one or more adjustment devices such as dials 2d, 2e and 2f, as shown in FIGS. 1A and 2A. The control unit 2 may further include additional control devices and/or indicator devices and display.

A preferred mobile radiation system is adapted to produce UV radiation having peak radiation wavelength in a range of from 250 nm to 450 nm and peak irradiation power in a range of from 0.5 W/cm2 to 10 W/cm2. Different UV sources can be used produce UV irradiations at same or different wavelengths. In one example, an arc UV source can have a peak wavelength at about 315 nm or 365 nm. In another example, an LED UV source can have a peak wavelength at about 365 nm.

The radiation blocker can comprise one or more UV blocking elements 6 that permit visible radiations 21 to exit the radiation blocker while blocking UV radiations 22 from exiting said radiation blocker, when said mobile radiation device is in the seated position, as shown in FIGS. 2A-2C. The UV blocking elements can be transparent, translucent, fluorescent, or a combination thereof. Examples of radiation blocker can include UV blocking glass, UV blocking plastics or other polymers, or a combination thereof. The radiation blocker can also comprise one or more total radiation blocking elements 7 that block UV radiations and visible radiations from exiting said radiation blocker. Examples of the total radiation blocking elements can include metal sheets or blocks, ceramic sheets or blocks, or any other materials that can block UV radiations and visible radiations.

One advantage of the system disclosed herein is that the UV blocking elements 6 can permit visible radiations 21 to exit the radiation blocker so an operator can visually confirm that the UV source is actually powered when the mobile radiation device is seated on the radiation blocker nest without being exposed to the UV irradiation.

Figure 1B:
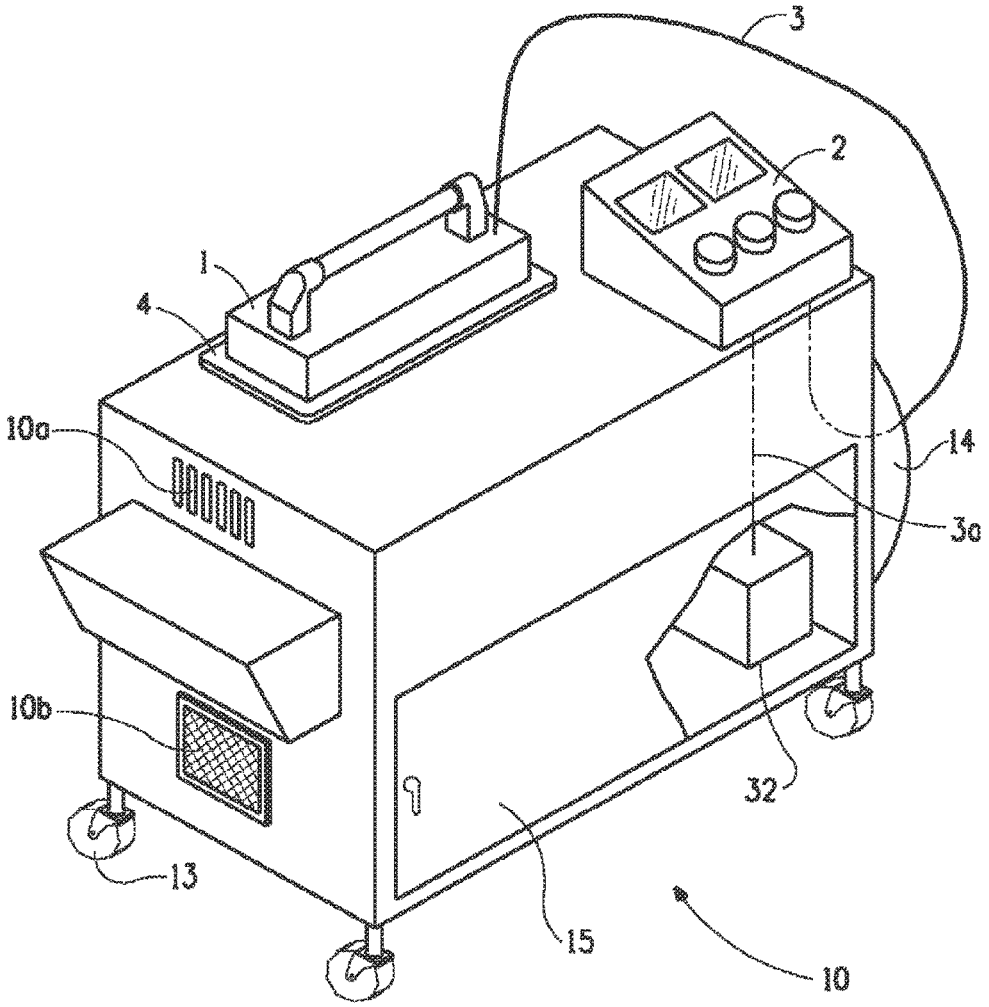
FIG. 1B is a schematic view of the FIG. 1A embodiment with the radiator seated in its nest.
Figure 5:
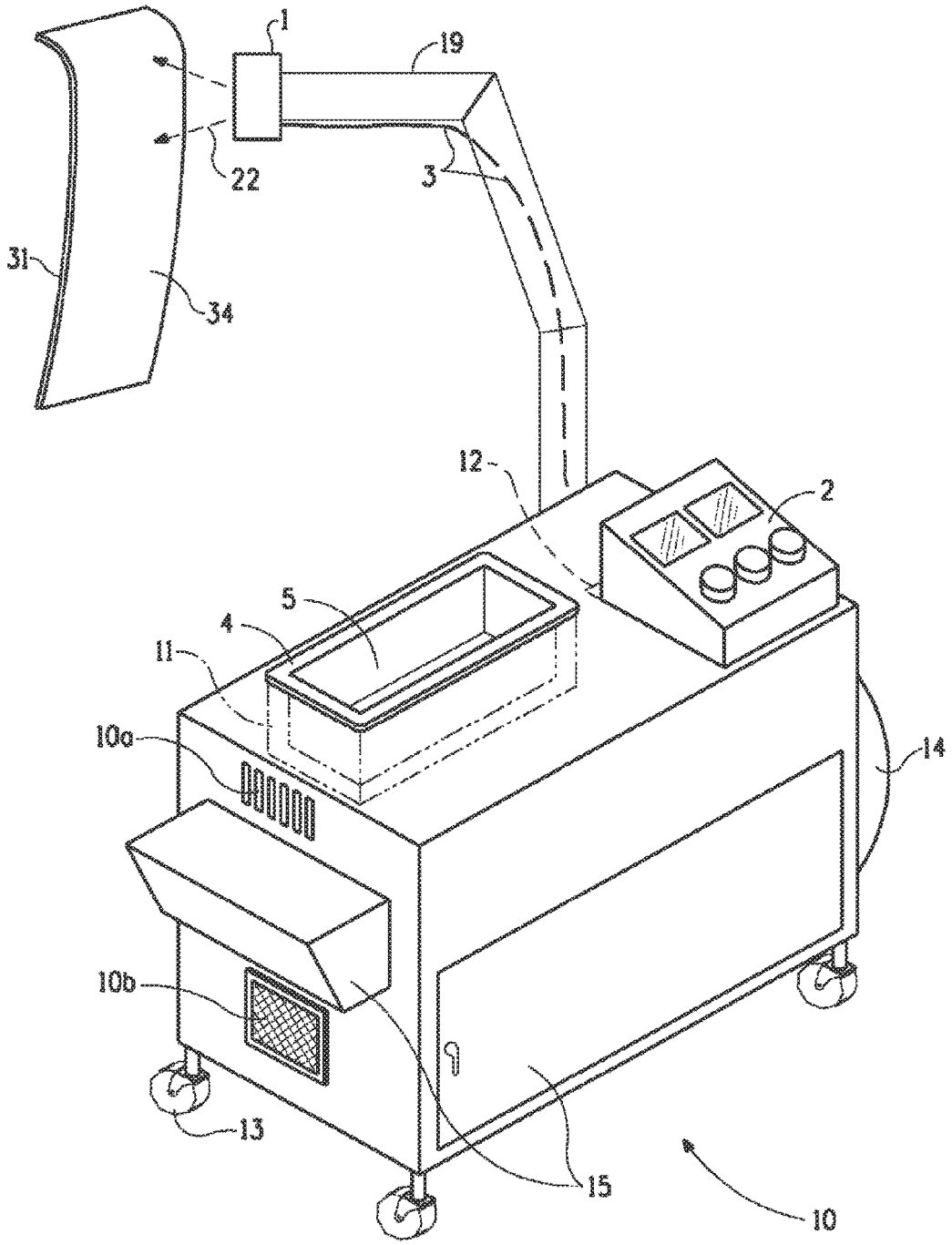
FIG. 5 is a front, upper perspective view of an alternate embodiment system that includes movable arm for mechanically extending the irradiator to a remote surface to be cured.

The mobile carrier can further comprise a coupler supporting device 14 for storing and supporting said one or more coupling devices or power and/or control signal cords 3 that couple the mobile radiation device and the control unit, as shown in FIGS. 1A, 1B and 5. The mobile carrier can further comprise one or more storage compartments 15, as shown in FIGS. 1A, 1B and 5.

Figure 3A:
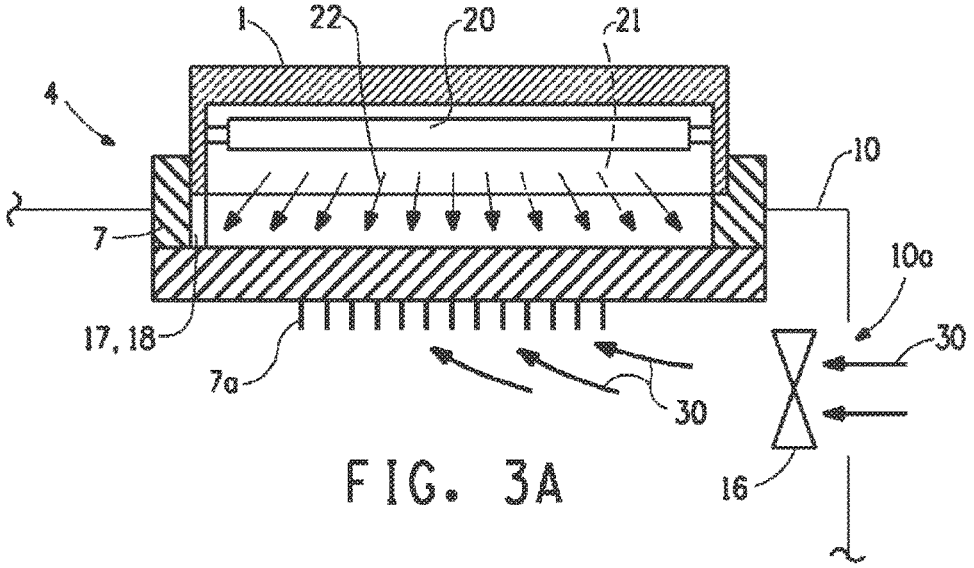
FIG. 3A is a schematic cross-sectional schematic view of the FIG. 2A radiator and a carrier cooling fan.
Figure 3B:
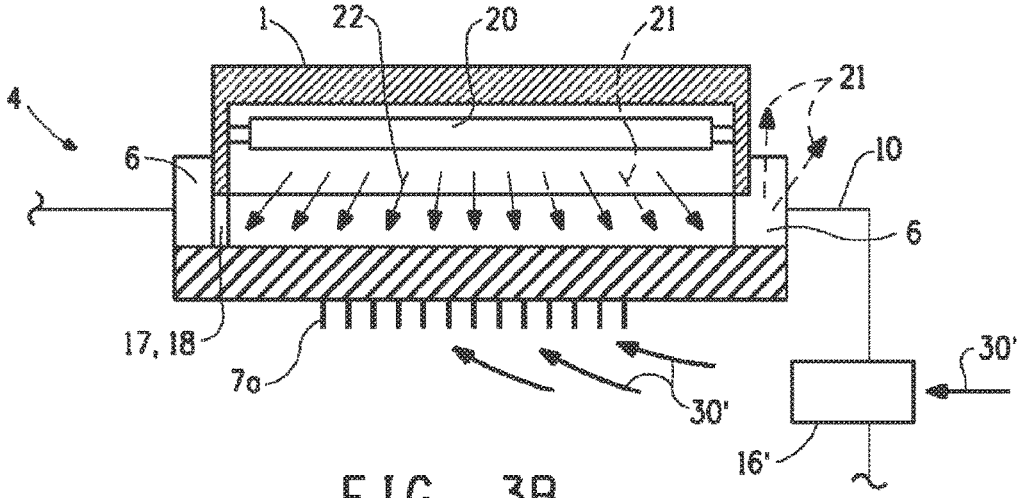
FIG. 3B is a schematic cross-sectional schematic view of the FIG. 2A radiator and a carrier cooling air duct.

The mobile carrier can further comprise at least a cooling device 16 for cooling said mobile radiation device in said seated position. The cooling device can comprise a carrier cooling fan 16, as shown in FIG. 3A, a carrier cooling air duct 16, as shown in FIG. 3B, or a combination thereof. The mobile carrier can further comprise one or more vents 10a-10b, as shown in FIG. 1A to provide ventilation. In one example, ambient external air 30 can be forced by the fan 16 into the carrier to cool the radiation blocker shown in FIG. 3A. In another example, cooled air 30' can be provided to the carrier via the carrier cooling air duct 16', as shown in FIG. 3B. In another example, the carrier can comprise a combination of the cooled air and the fan to provide the cooled air 30' into the carrier by the fan 16. The radiation blocker can have a plurality of thermal fins 7a for dispersing heat, as shown in FIGS. 3A and 3B. In another example, the carrier cam comprise thermal fins and at least one vent, as shown in FIG. 10a or 10b, without the fan.

The cooling device can comprise a cooling sensing device 17 to power on the cooling device when said mobile radiation device is in the seated position. When the mobile radiation device is moved from the seated position, the cooling sensing device 17 can automatically turn off the cooling device to conserve power.

The mobile carrier can further comprise an activity sensing device 18, as shown in FIG. 2C coupled to the mobile radiation device and the control unit to power off the mobile radiation device if the mobile radiation device is powered and remains in the seated position for a predetermined period of time. In one example, the cooling sensing device 17 and the activity sensing device 18 can be configured into one single device, as shown in FIG. 2C so the cooling device can be triggered to be turned on when the mobile radiation device is placed in the seated position and subsequently, the power can be turned off if the mobile radiation device remains in the seated position for a predetermined period of time.

Figure 4A:
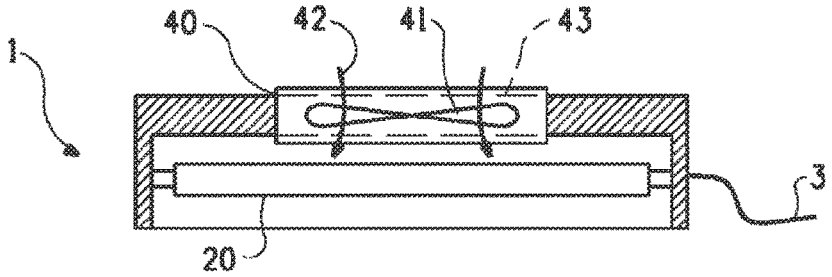
FIG. 4A is a cross-sectional view of an alternate preferred embodiment of a radiator that includes a vent fan and a shutter system.
Figure 4B:
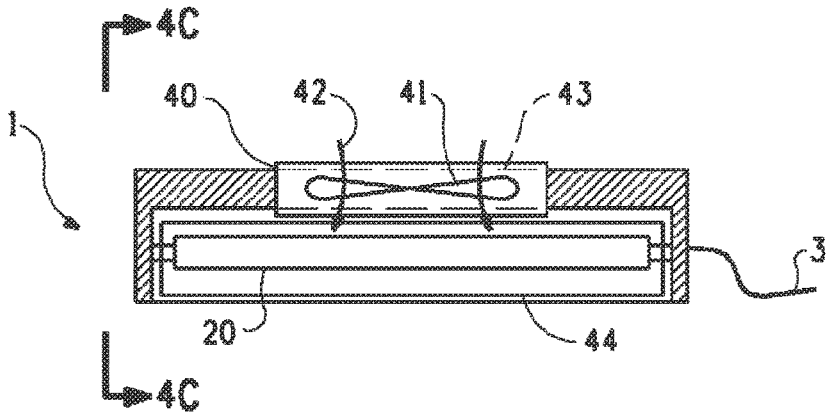
FIG. 4B is a cross-sectional view of an alternate preferred embodiment of a radiator that includes a radiation reflector.

The mobile radiation device can comprise at least one cooling vent 40 on the radiation device, as shown in FIGS. 4A-4B. The mobile radiation device can further comprise at least one vent fan 41, a shutter system 43 to block the radiation of the UV source from exiting through the cooling vent 40 while allowing cooling air 42 to flow through the cooling vent, or a combination thereof.

Figure 4C:
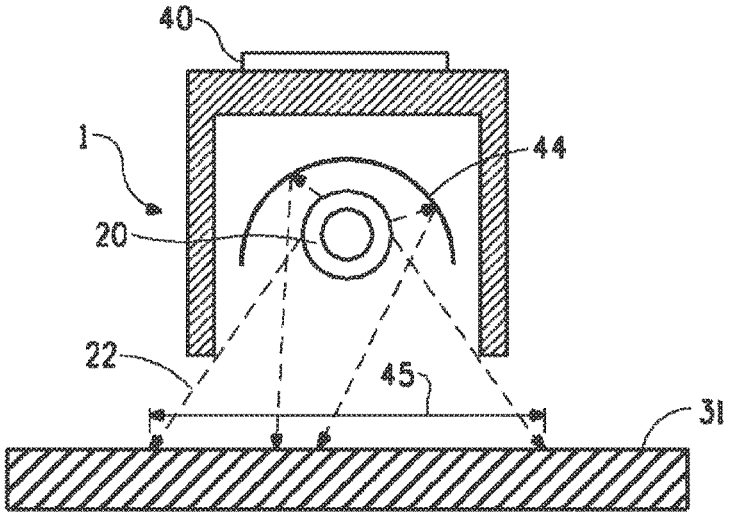
FIG. 4C is a cross-sectional view of an alternate preferred embodiment of a radiator that includes a radiation area.

The mobile radiation device can further comprise a radiation reflector 44, as shown in FIGS. 4B and 4C to reflect the radiation toward a predetermined direction, such as directing to a substrate, shown in FIG. 4C for example. The mobile radiation device can be configured using the radiation reflector, the opening of the mobile radiation device to adjust a radiation area 45 over a target 31, as shown in FIG. 4C.

The one or more carrier motion devices 13 can be selected from wheels, powered wheels, rolling Wheels, tracks, rails, or a combination thereof.

The mobile radiation system can further comprise a battery power source 32 for supplying power to the mobile radiation device 1, the control unit 2, or a combination thereof.

The mobile carrier can further comprise one or more radiation supporting devices 19, as shown in FIG. 5, to position said mobile radiation device for providing radiation to a target. In one example, one of radiation supporting devices 19 can be a retractable arm so the mobile radiation device can be attached at one end. In another example, the radiation supporting device can be coupled to a computing device or other automation devices to move the mobile radiation device in a predetermined pattern, predetermined distance to a target, a range of predetermined velocity, or a combination thereof.

The aforementioned target can comprise a target coating layer 34, such as a wet coating layer over a coated area of a substrate 31, as shown in FIG. 5. The target coating layer 34 can be formed from one or more radiation curable target coating compositions applied over the coated area of the substrate. The target coating compositions can be solvent borne or waterborne coating compositions. The target coating layer can be cured with the radiation alone or a combination of the radiation with one or more curing processes selected from thermal curing, physical drying curing, chemical curing, or a combination thereof. Thermal curing can include curing at ambient temperatures, such as temperatures in a range of from 15° C. to 50° C.; at elevated temperatures, such as temperatures in a range of from 50° C. to 350° C.; or a combination thereof. Lacquer coating compositions can be cured by drying. The term "lacquer" or "lacquer coating composition" refers a coating composition that is capable of drying by solvent evaporation to form a durable coating on a substrate.

Chemical curing can include the reactions between crosslinkable and crosslinking functional groups. Typical crosslinkable and crosslinking functional groups can include hydroxyl, thiol, isocyanate, thioisocyanate, acid or polyacid, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

It would be clear to one of ordinary skill in the art that certain crosslinking functional groups crosslink with certain crosslinkable functional groups. Examples of paired combinations of crosslinkable and crosslinking functional groups can include: (1) ketimine functional groups crosslinking with acetoacetoxy, epoxy, or anhydride functional groups; (2) isocyanate, thioisocyanate and melamine functional groups each crosslinking with hydroxyl, thiol, primary and secondary amine, ketimine, or aldimine functional groups; (3) epoxy functional groups crosslinking with carboxyl, primary and secondary amine, ketimine, or anhydride functional groups; (4) amine functional groups crosslinking with acetoacetoxy functional groups; (5) polyacid functional groups crosslinking with epoxy or isocyanate functional groups; and (6) anhydride functional groups generally crosslinking with epoxy and ketimine functional groups.

The irradiation curable functional groups can include ethylenically unsaturated double bonds, such as acrylic or methacrylic double bonds. Sources of UV irradiation for curing can include natural sunlight or artificial UV radiation sources. Examples of UV irradiation for curing can include, but not limited to, UV-A radiation, which falls within the wavelength range of from 320 nanometers (nm) to 400 nm; UV-B radiation, which is radiation having a wavelength falling in the range of from 280 nm to 320 nm; UV-C radiation, which is radiation having a wavelength falling in the range of from 100 nm to 280 nm; and UV-V radiation, which is radiation having a wavelength falling in the range of from 400 nm to 800 nm.

A coating composition having crosslinkable and crosslinking functional groups and the irradiation curable functional groups can be cured by a combination of the chemical curing and the irradiation curing. Such coating compositions can be referred to as a dual cure coating composition.

The substrate can be a vehicle or vehicle part.

This disclosure is further directed to a kit for a mobile radiation system. The kit can comprise:

(b1) a mobile radiation device;

(b2) a control unit;

(b3) one or more coupling devices;

(b4) a radiation blocker having an adaptor opening for receiving the mobile radiation device (1) in a seated position on the radiation blocker;

(b5) a mobile carrier comprising a first compartment for housing the radiation blocker, a second compartment for housing the control unit, and one or more carrier motion devices;

wherein the mobile radiation device is connectable to the control unit via the one or more coupling devices;

the adaptor opening dimensionally fits the mobile radiation device to block radiations from the mobile radiation device when the mobile radiation device is received in the seated position on the radiation blocker.

The mobile radiation device of the kit can be configured to produce radiations having peak radiation wavelength in a range of from 250 um to 450 nm and has a peak irradiation power in a range of from 1 W to 10 W.

The radiation blocker of the kit can comprise one or more UV blocking elements 6 that are capable of permitting visible radiations 21 to exit the radiation blocker while blocking UV radiations 22 from exiting the radiation blocker, the one or more UV blocking elements are transparent, translucent, fluorescent, or a combination thereof.

The mobile carrier of the kit can further comprise at least a cooling device 16 connectable to the mobile radiation device and the control unit for cooling the mobile radiation device, and the cooling device comprises a cooling sensing device 17 connectable to the cooling device to power on the cooling device when the mobile radiation device is received in the seated position.

The mobile carrier can further comprise an activity sensing device 18 connectable to the mobile radiation device and the control unit to power off the mobile radiation device when assembled and powered, if the mobile radiation device is powered and remains in the seated position for a predetermined period of time.

With reference to FIGS. 6-18 an improved, alternate embodiment mobile UV curing device or mobile irradiator and method of use will be described. As shown in FIGS. 6-10 mobile UV curing device 50 is shown with a housing, cart or cabinet 52, wheels 54, handheld lamp irradiator 56, standby nest 58, operator control station 60 and electrical connections and power switch 62. The mobile UV curing irradiator also cable bracket 82, which is shown attached to the side of the housing 50 and is sized and adapted to hold coils of electrical cords or cables, such as system input power, irradiator power input and irradiator control cables. Also included are filters or vent screens 78, 78, inlet power supply connection 76, ON/OFF switch 77, AC power to the lamp and DC control power to the irradiator 79 and cable bracket 82.

Figure 6:
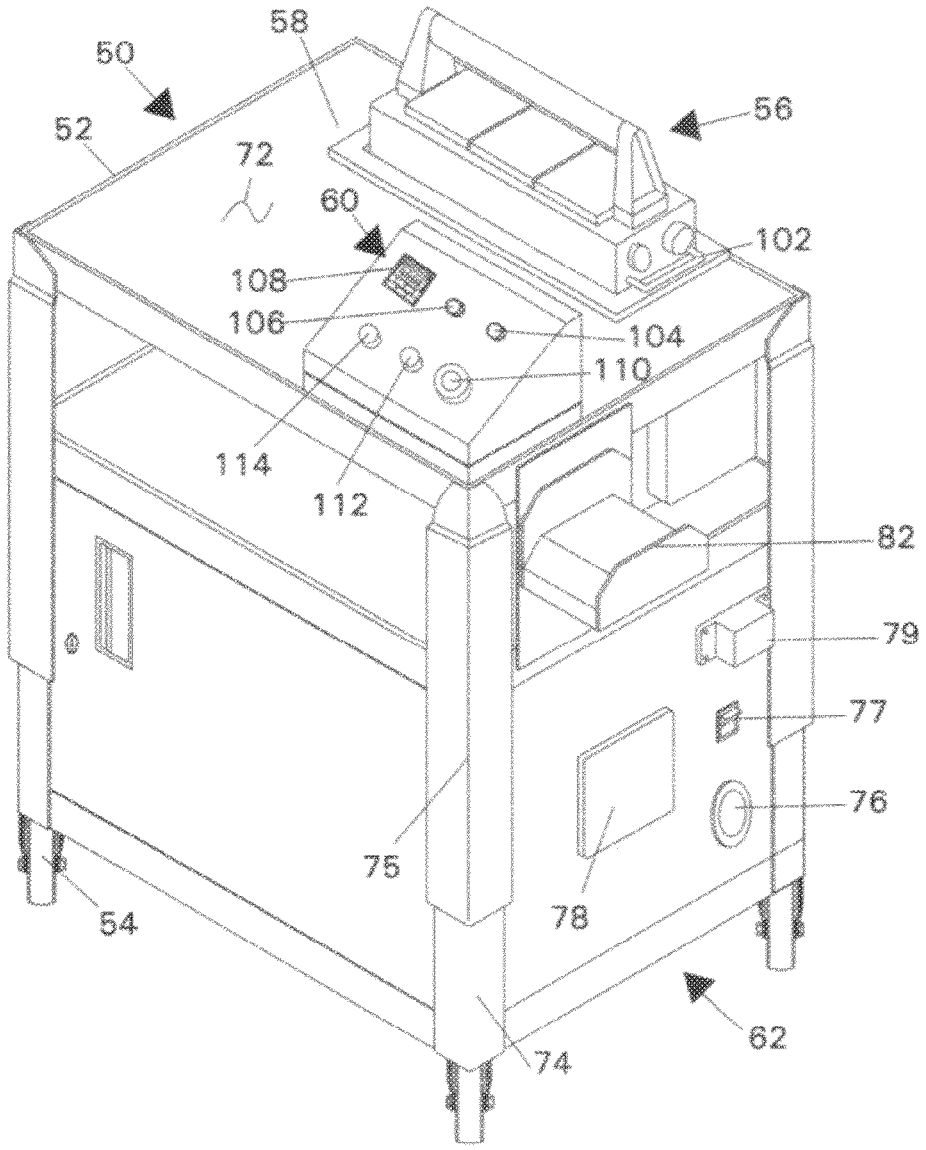
FIG. 6 is a front, upper right perspective view of an alternate embodiment system.
Figure 7:
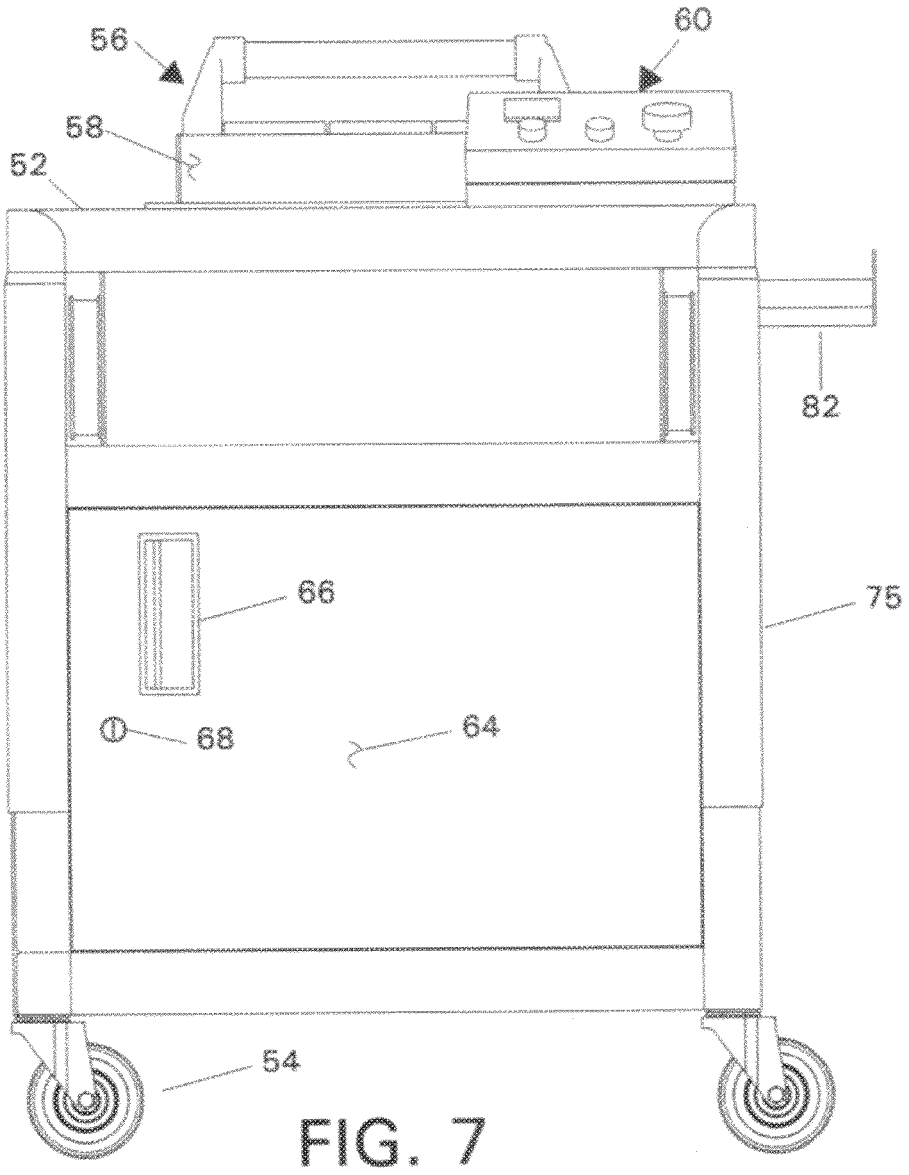
FIG. 7 is a front view of the FIG. 6 embodiment.
Figure 8:
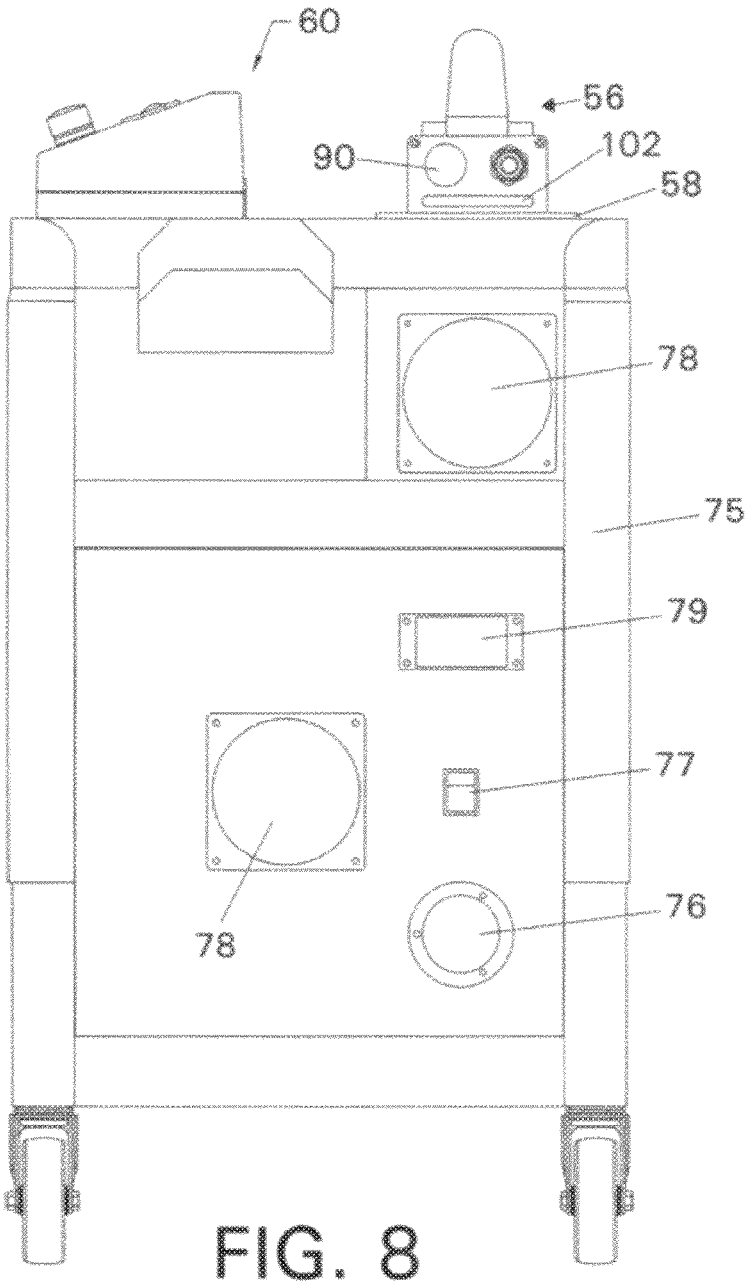
FIG. 8 is a front, right side perspective view of the FIG. 6 embodiment.
Figure 9:
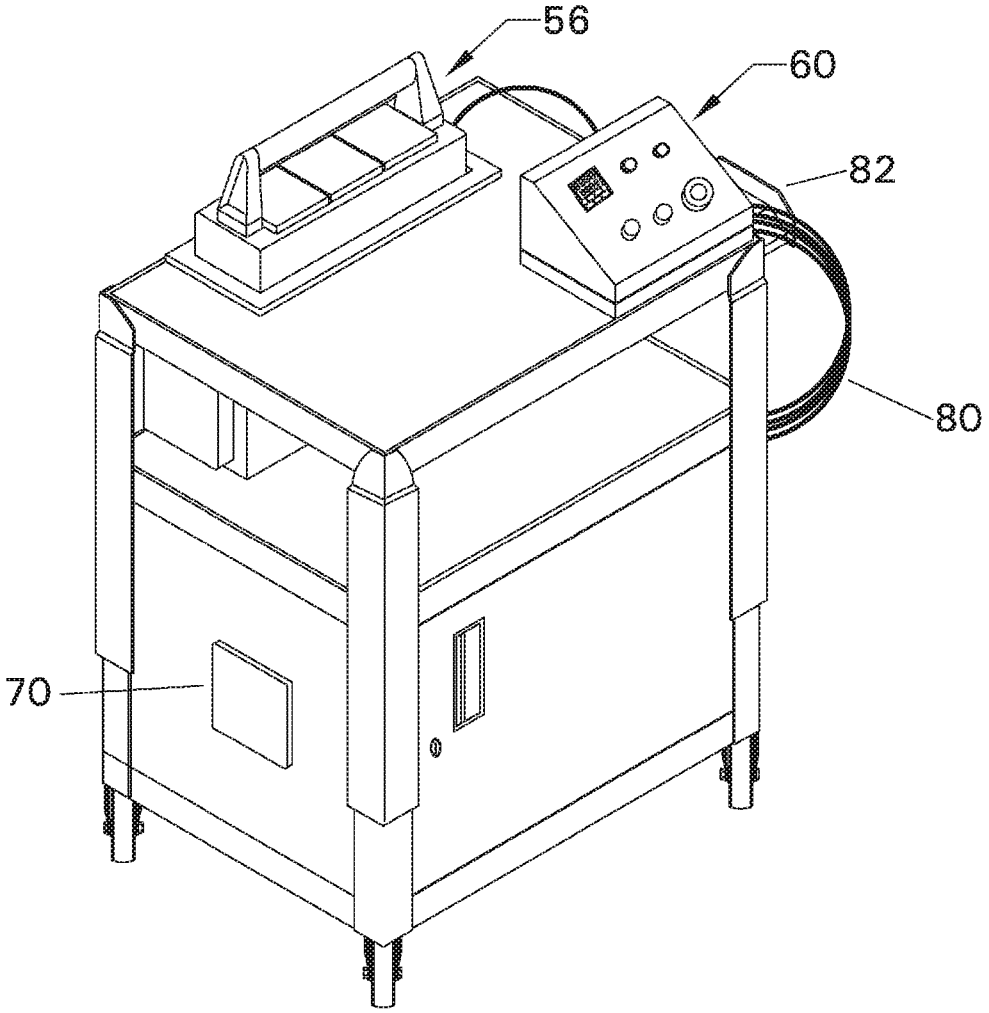
FIG. 9 is a top, left side perspective view of the FIG. 6 embodiment.
Figure 10:
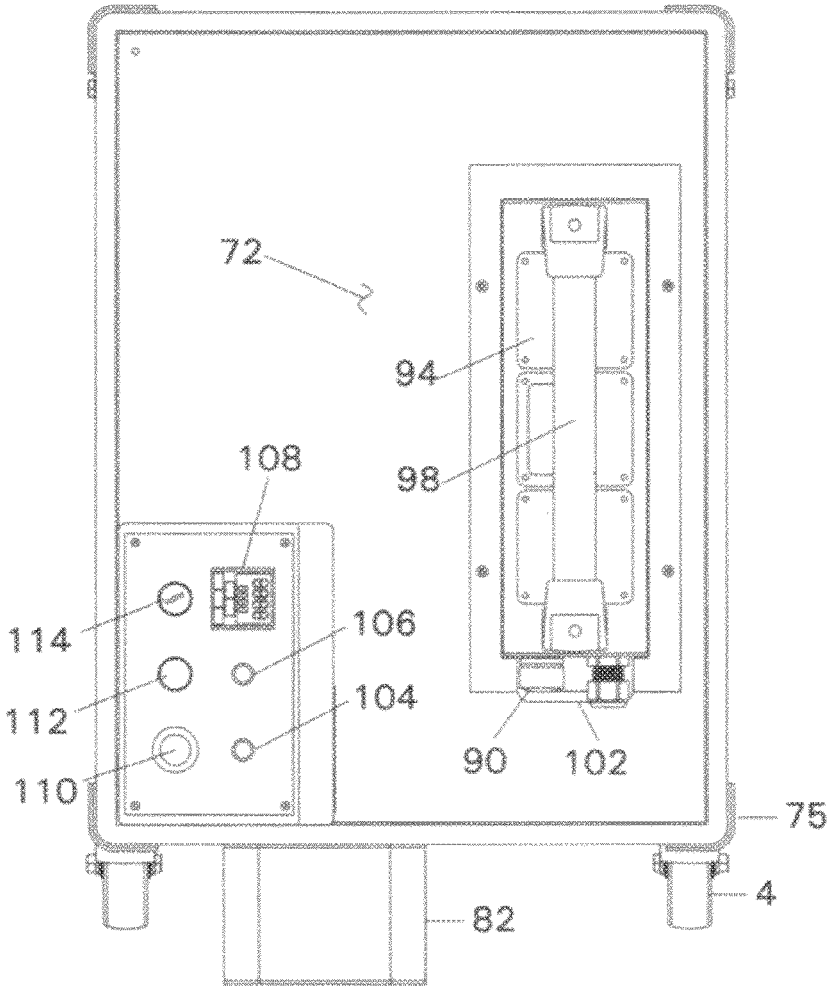
FIG. 10 is a top view of the FIG. 6 embodiment.
Figure 11:
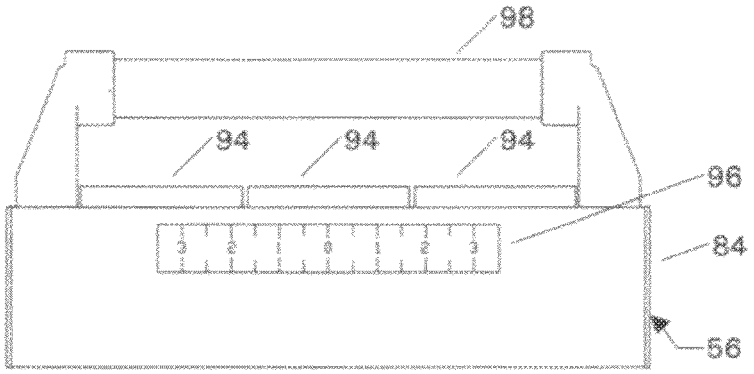
FIG. 11 is a side view of a preferred hand-held irradiator of the FIG. 6 embodiment.
Figure 12:
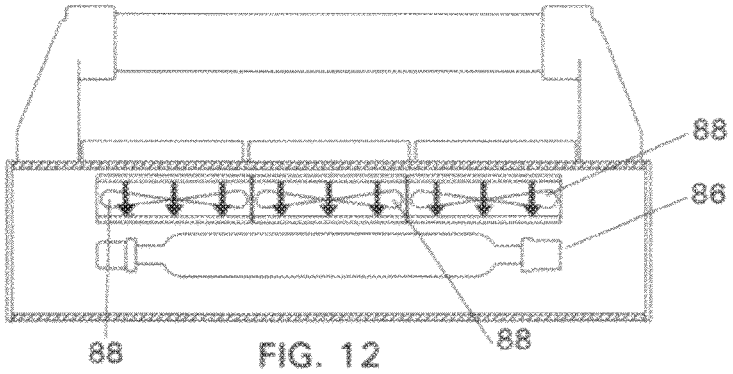
FIG. 12 is a side cross-sectional view of the FIG. 11 irradiator.

A preferred cart 52 is a Luxor brand, AVJ42C, A/V cart with locking cabinet that is commercially available. FIG. 6 is a front perspective view of the device 50 from the upper right side also showing the lockable front access panel 64 of the cabinet 52 and with the electrical connections and power switch on the right side of the housing. FIG. 7 is a front view of the UV curing device and FIG. 8 is right side view of the UV curing device. FIG. 9 is perspective view of the device 50 taken from the upper left side and showing the front panel 64 partially open. Front panel 64 includes handle 66 and lock 68. A vent 70 is positioned on the left side of the housing 62. FIG. 10 is a top view of the FIG. 6 mobile UV curing irradiator cart.

As shown in FIGS. 6-10 an upper surface or deck 72 rests on four upright members or metal legs, one of which is shown at 74. While the legs can be of any material or shape that will support the upper surface, the legs shown are preferably made of metal, and are of a right angle configuration. The each leg preferably has a rubber or other elastic bumper 75.

The housing 52 preferably contains the power supply for the device, partially shown in FIG. 9, and described in greater detail below. Also described in detail below are cooling or vent fans and filters which are adapted to exhaust excess heat generated during operation and to maintain the temperature of the device within a safe range of temperatures. With reference to FIGS. 6-10, the cart 52 rests on and is mobile due to conventional doily wheels 54, preferably each of which is rotatable about a horizontal axis and rotatable about a post to provide maximum turning capability and minimum turn radius. Preferably the wheels are adapted for ease of movement in an industrial repair facility, most preferably a painting booth adapted for vehicle repair, such as in a car or truck body shop that often have grid pads or a gridded floor. Thus, the wheels should be made of a grease and oil impervious material, and are of a size adapted for grid avoidance. To satisfy these criteria the wheels are preferably at least about 4 inches in diameter, and each wheel preferably includes a brake.

Figure 13:
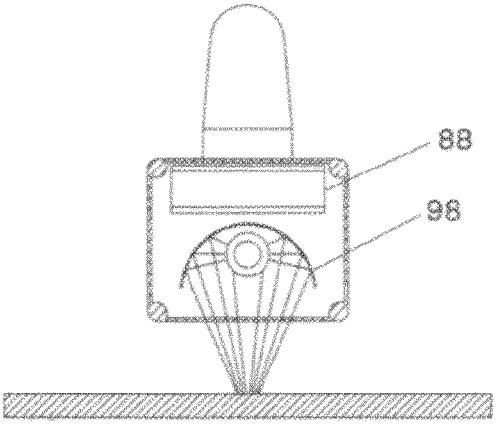
FIG. 13 is an end cross-sectional view of the FIG. 11 irradiator showing irradiation focusing provided by the reflector.
Figure 14:
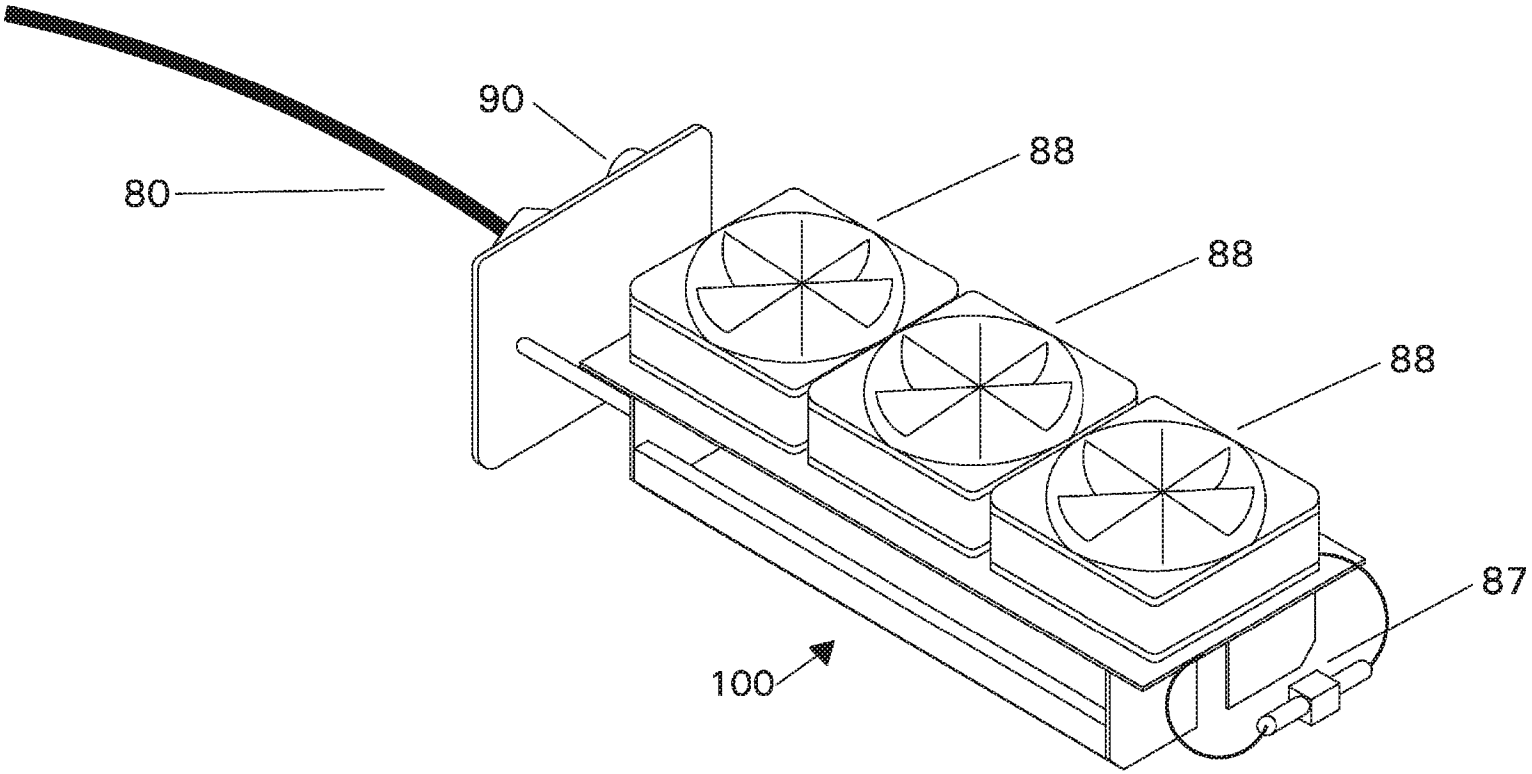
FIG. 14 is a top, perspective view of the internal structure of the FIG. 11 irradiator.
Figure 15:
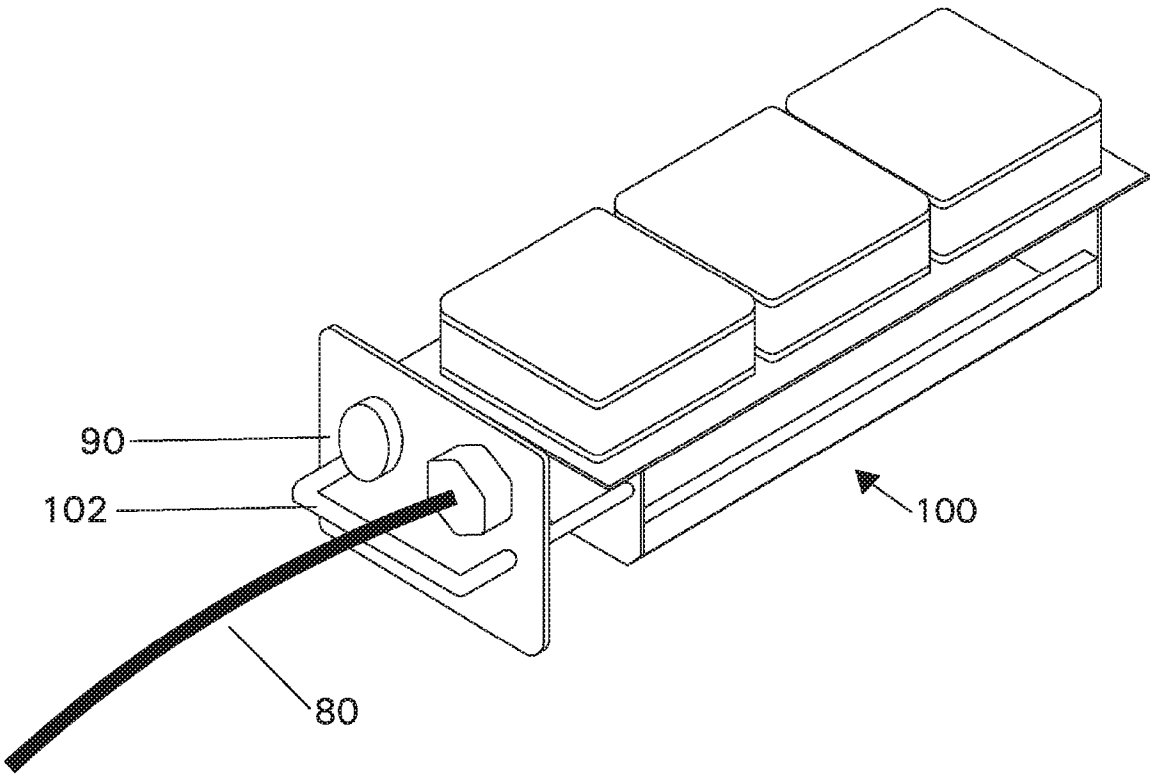
FIG. 15 is a top, front side perspective view of the front face and internal structure of the FIG. 11 irradiator.

Referring to FIGS. 11-15 a preferred hand held irradiator includes a housing 84, preferably made of extruded aluminum with the aluminum coated with a conventional, heat resistant paint. The irradiator includes lamp 86, which during operation provide a range of radiation in the UVA, UVB, UVC, IR and visible ranges. The lamp 86 is a conventional UV Mercury curing lamp, 6-inch length, manufactured by and available from, Albatross UV, Post Falls, Idaho as its part number H06A2-3-02. Preferably lamp 86 is a 6 inch, ozone free mercury UV output lamp for use in curing paint primer for use in vehicle repair. The lamp 86 is positioned in the irradiator with conventional connections and conventional, quick-connect lamp leads 87. The irradiator 56 includes emergency stop switch 90 and preferably a power cord 80 of at least a 20 foot length to provide for the user to easily move the irradiator to the location(s) of the vehicle, or other surface that requires curing. The power cord 80 is preferably a no-twist, conventional multi-conductor cable. The irradiator 56 also includes one or more cooling fans, three of which are shown at 88, 88, and 88 and adapted to provide cooling air from ambient and in the direction shown by the arrows in FIG. 13. During operation these fans exhaust heat out of the irradiator to maintain it within a standard operating temperature range. The fans are conventional, and preferably are commercially available high speed fans. Positioned on the top of the fans are conventional filters and radiation shields or blockers, shown at 94, 94 and 94. In the most preferred embodiment ruler markings 96 are provided on the outside, long sidewall and function to inform the user of the location of the radiation cure path width during operation. In the most preferred embodiment, the device is adapted and sized for a 6 inch cure path, with the centerline marked with a "0" and ruled markings extending out for a distance of 3 inches on each side of the "0". The irradiator also includes a reflector 98, shown in FIG. 13, and that functions to direct the radiation outward in a desired irradiation pattern. For the use in vehicle repair and painting or repainting, a reflector configured to focus the output radiation generally along a line or narrow band extending along the cure path is preferred. A band of about 1 inch is preferred. The most preferred reflector is a strip reflector, manufactured by and commercially available from ALANOD, Germany, anodized aluminum, PVD-coated, with reinforced reflection, MIRO 4 4400 GP, image clarity of 95 D/I, total reflectance (TR2) of 95, diffuse reflectance <12, "brightness along" of 89 and "brightness across" of 88, efficiency class A. This reflector material is optimized for UVA output and is fashioned in the hand held radiator to provide a narrow band focal point or length, as shown in FIG. 13. The reflector has a generally of a parabolic cross-section and is positioned relative to the longitudinal centerline of the lamp so that a beam or band of irradiation of about 1-inch in width is focused at a distance of about 6 inches from the longitudinal centerline of the lamp. As a result, the area of maximum UV irradiation intensity is in this band. The preferred fans are commercially available from MC36329-Axial fans, 80 mm, 60 cfm, and 46.5 dBA, commercially available from Multi-comp as its part number 23T0657. The preferred filters are Qualtek brand 09325-F/45-fan filter assemblies as its part number 87F3920. The remaining components of the irradiator and cabinet or cart are conventional components such as connectors, switches, strain relief cord connectors, lock nuts, receptacles and sockets, panels, circuit breaker, lock, cords, plugs etc.

The irradiator 56 also includes a top handle 98 for use in holding the irradiator during normal operation. Handle 98 is preferably positioned on the top side of the irradiator, lengthwise and at a height sufficient for the user to hold the irradiator and for enough space or height between the top of the filters 94 and the user's gloved hand to permit free flow of air out of the irradiator and through the cooling fans or vents 94. The irradiator also includes inner lamp cartridge 100, shown in FIGS. 12-15, and that functions to hold the lamp, the fans, emergency stop switch 90, related wiring and pull handle 102. Most preferably, the length of the hand held irradiator is about 13.71 inches; the width about 4.14 inches and the height from the bottom to the top of the top handle is about 6.56 inches. Nest 58 is preferably a commercially available heat sink manufactured by HS Marston as its brand 890SP-02000-A-100-force cooled heat sink, 0.07 A° C./W, commercially available from Newark Electronics.

As shown in FIGS. 6-10, the control console 60 includes power indicator light 104, lamp status light 106, lamp hour timer 108, lamp stop switch 110, lamp start button 112 and keyed lamp hour timer reset switch 114, each of which is described in more detail with reference to the FIGS. 16-18 circuit diagrams.

Figure 16:
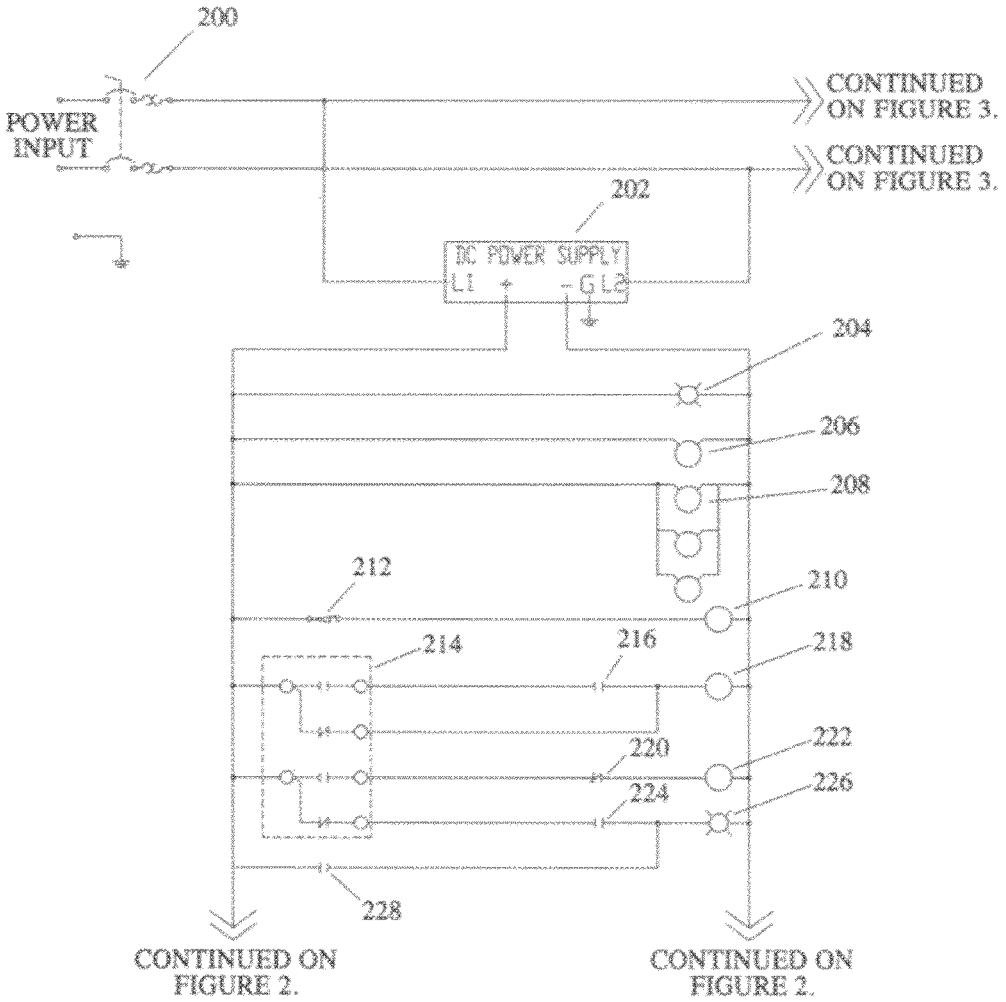
FIG. 16 is a partial schematic circuit diagram of the power and circuit of the FIG. 6 embodiment.
Figure 17:
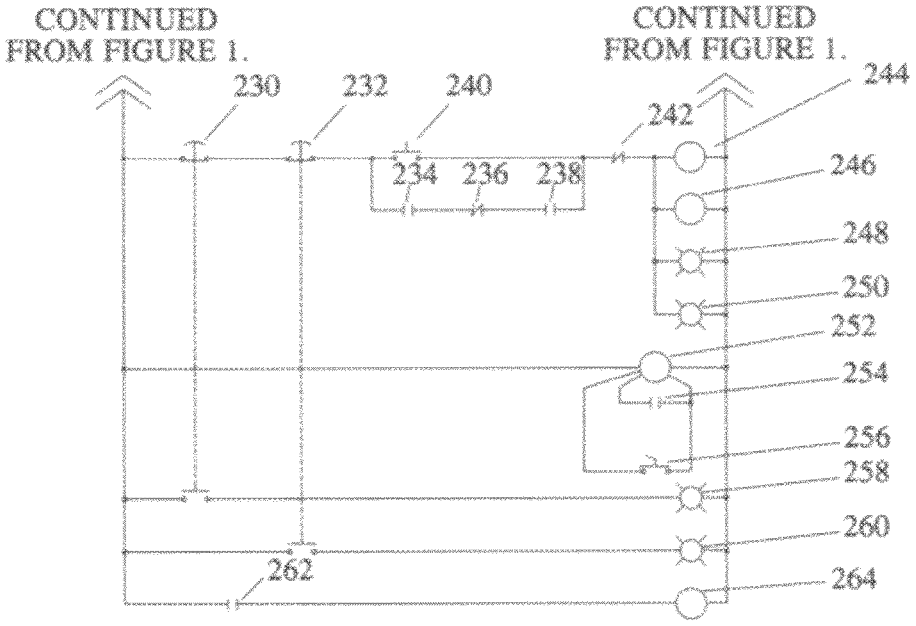
FIG. 17 is a continuation of the FIG. 16 partial schematic circuit diagram.
Figure 18:
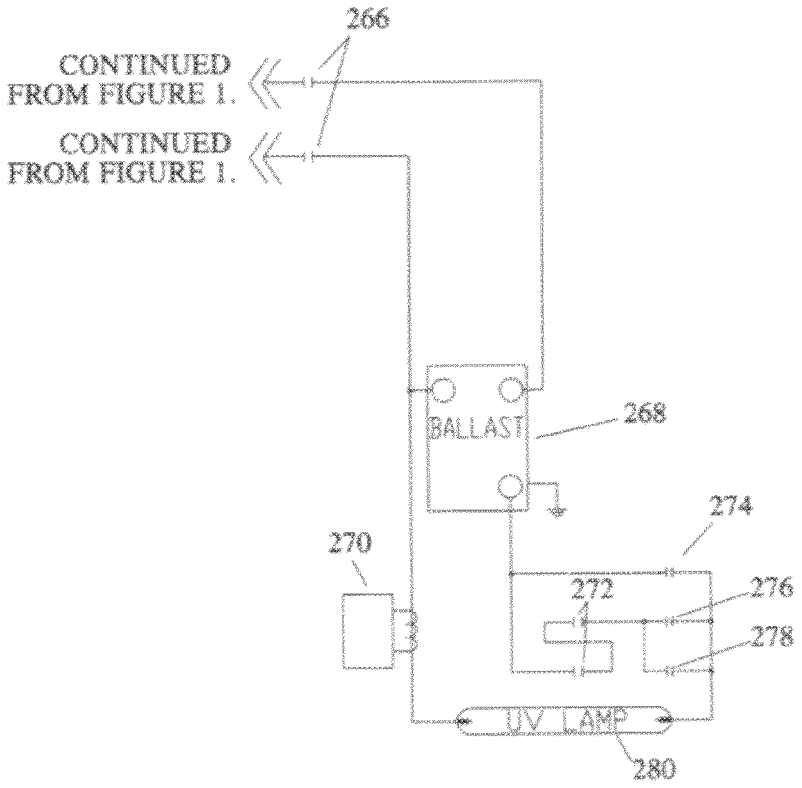
FIG. 18 is a schematic circuit diagram of the lamp circuit of the FIG. 6 embodiment.

Referring to FIGS. 16-18 a preferred power supply, electrical circuit and method of use are described. The preferred UVA irradiator system is based on a 2 KW ballast, and accepts input power of 208-240 VAC of 50 Hz or 60 Hz through main circuit breaker 200 as shown in FIG. 16. Upon applying power and switching circuit breaker 200 to the ON position the DC power supply 202 is energized. The DC power supply 202 is used to for all signal power for the control systems shown in FIGS. 16 and 17. Power indicator light 204, cabinet fans 206 and irradiator fans 208 will be active when the DC power supply 202 is on. All of the components for the main power board are commercially available components including a ballast, panel enclosure, 24 VDC, 2.5 A (60 W) DIN power supply, contactors, mini-time on-delay 2PDT 24 V 1M-10M, relays, coil LED indicators, relay sockets, switches and terminal blocks, as would be understood by a person of ordinary skill in this field.

To operate the system, disengage lamp stop buttons 230 and 232 are disengaged. One of the stop buttons, or emergency stop switches, is preferably located on the irradiator 230 and the other is on the operator station 232 as shown in FIG. 16. To ignite the lamp, the lamp irradiator should be in the nest, and then the lamp start push button 240 on the front of the operator station is pressed. Signal power will then be provided to the lamp start relay 244, the lamp ready timer 246, the lamp 'ON' indicator light 248, and the lamp status indicator light 250. Energizing the lamp start relay 244 causes contacts 266 to close, and allows the lamp ballast 268 to be powered. The ballast 268 in turn provides a constant wattage power to the UV lamp circuit as shown in FIG. 18. If the lamp does not ignite, no current flow will be detected by the current sensing relay 270 and the current sensing relay contact 238 will not close, the power to the lamp circuit will be removed as soon as the operator releases the lamp start pushbutton. If the lamp ignites current flow will be detected by the current sensing relay 170 and the current sensing relay contact 238 will close, the lamp circuit power will be maintained after the operator releases the lamp start button. The preferred ballast is a 2000 W ballast, including capacitors, manufactured by and commercially available from Shape, LLC, Addison, Ill. as its part number Z7954. With power flowing to the UV lamp 280 the gases inside the lamp will ignite. During ignition the mercury in the lamp will vaporize into the plasma. As the mercury vaporizes the voltage of the lamp will rise as the current falls until the optimal operating power is achieved.

During the warm-up phase all capacitors are energized by high power contacts 272 as controlled by the high power relay coil 218. The high power relay coil 218 is controlled by the warm-up timer contacts 214. These contacts are controlled by the lamp ready timer 252 which is preferably set to 2 minutes and automatically switches the lamp down to stand-by mode once this time is achieved by removing the signal power for the high power relay coil 218. Also during warm-up the tri-color lamp status indicator will be amber, with both the red LED 226 and green LED 250 energized. When the lamp ready timer 252 achieves its set point, then power will be removed from the red LED 226 and the lamp status indicator will show green.

Once the lamp status indicator shows green the system is ready to use. The operator can then remove the lamp irradiator from the nest on the top of the cart. When the irradiator is removed from the nest, the nest switch 212 will energize the nest switch relay 210 which will cause the nest switch relay contact 216 to close, and which will then allow the lamp to be switched to high power. The lamp irradiator can then be used to cure the curable surface, such as a coat of automotive paint primer, by passing the irradiator in front the surface to be cured at a distance from its surface of about 6 inches using a steady and overlapping motion, preferably at about the same rate of speed and at about the same distance from the surface as would take place when spraying the primer onto the surface. Once the curing operation is complete the operator puts the lamp irradiator back in to the nest. The nest switch 212 then allows the lamp to go back to stand-by power.

To turn OFF the UV lamp 280, either one of the lamp buttons 230 or 232 is depressed. In order to re-ignite the UV lamp 280 a sufficient amount of cooling time is required to allow the mercury inside the UV Lamp 220 to re-condense.

The system preferably includes an automatic shut-off timer that functions to turn the system OFF after a predetermined time of no use and lamp hour indication. After the "lamp ready" condition is achieved and the lamp irradiator is not removed from the nest after a pre-set period, as controlled by idle shutdown timer 222, the lamp will be turned off by the idle shutdown timer contact 236. The lamp hour timer 252 indicates the remaining time, in hours, of the ideal lifespan of the UV Lamp 280, typically 500 hours. The lamp hour timer 252 counts time as long as the UV lamp start relay contact 254 is closed. Once the timer reaches zero the lamp hour timer contact is opened 242 and the lamp is turned off and cannot be reignited until the lamp hour timer 252 is reset. After the operator installs a new UV lamp 280, the lamp hour reset switch 256 is activated using a key, which will reset the lamp hour timer 252 to 500 hours, at which time the lamp can be reignited.

Figure 19:
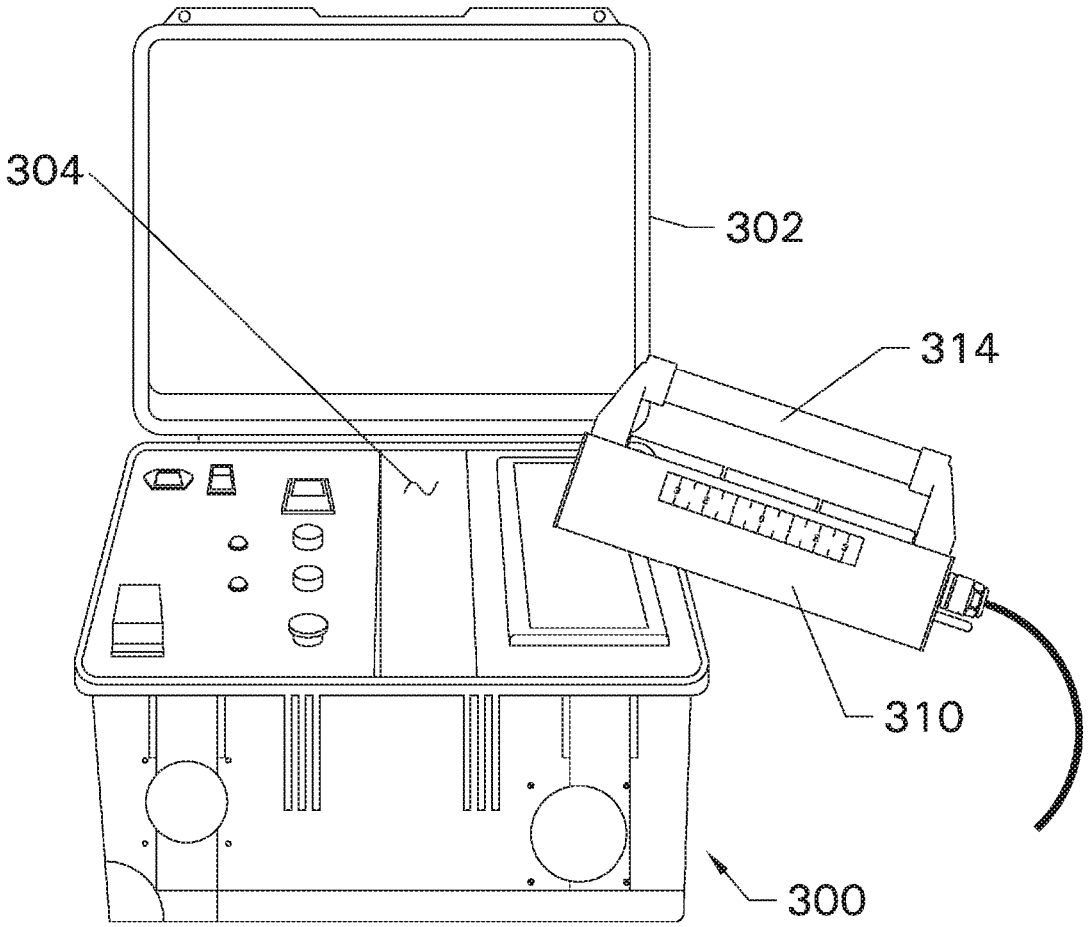
FIG. 19 is a top, perspective view of an alternate embodiment UVA curing system having a lower output power, smaller size and different advantageous structural features.
Figure 20:
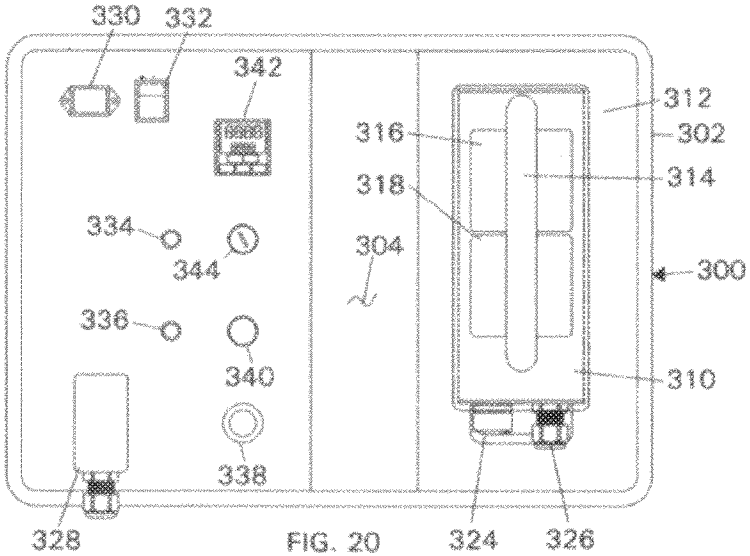
FIG. 20 is a top view of the FIG. 19 embodiment.
Figure 21:
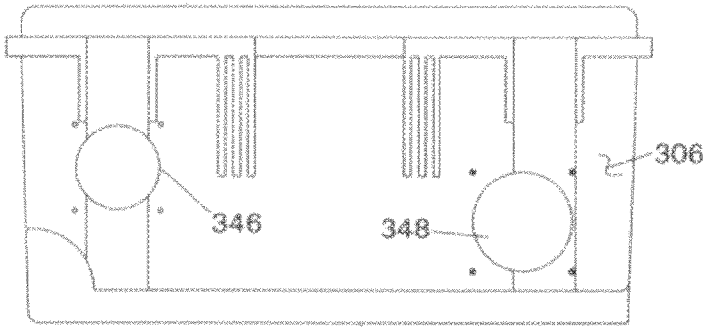
FIG. 21 is a front side view of the FIG. 19 embodiment.
Figure 22:
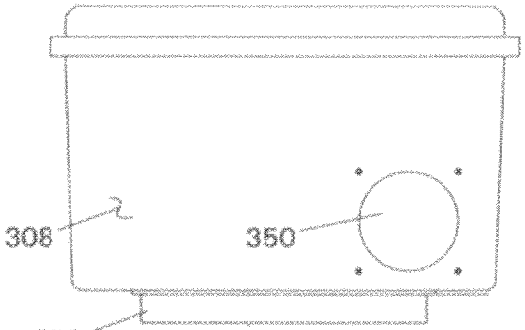
FIG. 22 is a side view of the FIG. 19 embodiment.

With reference to FIGS. 19-22 an alternate, "touch-up" embodiment hand held UVA irradiator system 300 and method will be described. This preferred touch-up embodiment is adapted for mobility, for use in curing relatively small areas of coated surfaces that are to be irradiation cured, such as found at dents, scratches and other damaged areas of vehicle body parts. This preferred embodiment is somewhat similar in design and operation as are the above embodiments, but preferably has a 1000 W ballast rather than a 2000 W ballast, and a smaller lamp, preferably 2.50 inches in length. The preferred 1000 W ballast is manufactured by and available from Venture Lighting International, Inc. The preferred lamp is also a Mercury vapor UV lamp. The irradiator reflector is adapted to focus a narrow beam s about 1100 watts of irradiation at a predetermined distance from the lamp's longitudinal centerline. As with the prior embodiments Shown in FIG. 19 is a front, upper perspective view showing the system 300 with the hand-held irradiator removed from its nest and the case, and ready for use.

The system 300 includes a case 302 having a middle cavity 304 adapted to hold a predetermined length of electrical cord, a first or front side panel 306 and a second side panel 308. Hand held irradiator 310 is shown resting in nest 312. The irradiator 310 includes a top handle 314, filter 316 and 318, which overlie fans 320 and 322, not shown, but which are preferably the same filters and fans, respectively, as described above. The hand-held irradiator also includes an emergency stop switch 324 and power cord connector 326.

The electrical control and system operating indicators are positioned on a top surface of its power supply, for advantageous use by the operator. Preferably, the power supply and these controls and indicators include irradiator cable connection 328, inlet power cable connection 330, circuit breaker 332, DC power on indicator light 334, lamp status indicator 336, lamp stop switch 338, lamp start button 340, lamp hour life indicator 342 and keyed lamp hour timer reset switch 344. These components are similar to those as described above, except that they are configured for an 1100 watt system and to fit within a hand-held carrying case.

The above-described systems are used cure irradiation curable surfaces, most preferably for curing as primers used for collision and cosmetic repair of vehicles. Use of these systems now enables a typical 30-minute cure time to be reduced to less than 1 minute and with improved quality of result, more uniform curing and increased safety to the system operator. A preferred method of irradiation curing includes the following steps. First, damage repair steps should be taken, which includes:

Preparing the surface by sanding down the scratched, dinged or other area for refinishing with 220 grit sand paper abrasive, in the same way as for most any other body repair.

Uniformly abrading the area of damage and masking it for overspray.

Providing a generous extended area for feather coat.

Wiping down the surface with high flash solvent (high flash insures no residue while removing any form of residue, dust or contamination).

Shaking the aerosol containing the UV curable coating can for 2 minutes after hearing that the mixing marble inside the aerosol can is free. (With larger repairs an option to use a HVLP spray gun version of UV curable materials is typically available).

Spray testing the aerosol insuring it is spraying correctly.

Using a uniform spray pattern apply 2 to 3 even coats of UV primer or finish, not exceeding 5 mil in thickness with most materials.

Providing about a 1-minute flash time between coats, for Cromax brand A3130S and LE3130S UVA Primer Surfacer. Follow manufacturer instructions for other coatings.

On average allow the surface to flash about 2 minutes before moving to the UV curing step for Hybrid UV Products (not needed for 100% active UV products).

Wear all proper personal protective equipment during use, including a full face shield or welder's helmet rated against UV lights, protective clothing including gloves and a long-sleeved shirt to reduce the exposure to the skin of hands, forearms and body.

Turn ON the UV light and when the UV light has been turned ON and is up to full power, begin drying most any UV curable primer, base coat or topcoat.

Begin the curing by working or moving the UV device from one end of the surface to be coated to the other end, covering the entire area that has been sprayed with the coating.

Hold the hand-held irradiator approximately 2-4 inches from the UV curable surface as the irradiator is moved from one end to the other, and at about the same rate of travel as used during the spraying of newly primed or finished areas, (if the irradiator is held at a greater distance than 4-inches, then a slower travel speed is used in order to fully cure the surface in the same number of passes as when held at 2-4 inches). Uniform left to right motion is preferably used to pass the hand-held irradiator over the surface while maintaining speed and distance consistency, that is, about 2-4 inches from surface at about 10 feet per minute (FPM) travel speed is preferred).

Preferably pass the light over the surface of the repair using the same pattern and speed used when applying the primer.

Preferably make each advancing pass at about 50% of the cure width over the area just previously passed. For example, using a 6-inch UVA lamp and a 6-inch initial pass, the second pass would overlap the first pass by about 3-inches, and so on for each subsequent pass.

Once the primer is cured, permit the surface to cool down and cure for several seconds.

Once the surface is cooled, the primer coating on the surface is cured and the area can be sanded in preparation for sealing or top coating.

Apply a base coat of paint.

Allow the base coat to dry.

Apply a clear coat.

The above specification and figures referred to are, accordingly, to be regarded in an illustrative rather than a restrictive sense. It will, however, be evident that additions, subtractions, deletions, and other modifications and changes may be made thereunto without departing from the broader spirit and scope of the inventions as set forth in the claims.

What is claimed is:

1. A mobile UV curing system for curing a radiation curable coating composition to form a cured coating layer comprising:

a handheld lamp irradiator comprising a housing having a top, a bottom, a height, a length, a width, a unitary, stationary reflector positioned within said housing and a UV lamp positioned within said housing between said reflector and said bottom;

said reflector extending along the irradiator length, adapted and positioned to reflect UV radiation along the lamp's length and to focus radiation toward a substrate positioned at predetermined direction from the bottom of said [radiation device] *irradiator*;

a handle positioned on the top of said irradiator housing and at a height sufficient for free flow of air between a user's gloved hand holding the handle and the top of the irradiator;

a mobile carrier comprising a housing having a top, a bottom, a power supply, dolly wheels positioned on the bottom of the carrier, a power cord extending from said power supply to said [radiator] *irradiator*, a system control unit and [a radiator ] *an irradiator* nest; said irradiator nest comprising a body having a top, bottom, sides and a cavity positioned on the top of said nest, said cavity sized and configured to receive and seat said irradiator.

2. The system of claim 1 wherein the handheld irradiator housing is made of extruded aluminum.

3. The system of claim 2 further comprising a heat resistant paint coating on said handheld irradiator housing.

4. The system of claim 2 wherein said lamp is a UV Mercury curing lamp.

5. The system of claim 2 wherein the reflector is configured to focus output radiation along a band extending along a cure path.

6. The system of claim 2 wherein the reflector is configures to focus output radiation along a band approximately 1-inch at a predetermined distance from the bottom of the irradiator housing bottom.

7. The system of claim 2 wherein the reflector is configured to focus output radiation along a band approximately 1-inch at a distance of about 6 inches from the longitudinal centerline of said UV lamp.

8. The system of claim 2 wherein the reflector is made of anodized aluminum.

9. The system of claim 2 wherein the length of the irradiator is about 13-14 inches.

10. The system of claim 2 further comprising at least one cooling fan positioned at the top of said irradiator housing and adapted to provide air flow from ambient toward the UV lamp.

11. The system of claim 3 further comprising a filter positioned on said irradiator housing above each cooling fan.

12. The system of claim 3 further comprising a UV radiation shield position on said irradiator housing above each cooling fan.

13. The system of claim 2 further comprising ruler markings on said irradiator housing along its length and to define a cure path.

14. The system of claim 2 further comprising an irradiator inner lamp cartridge adapted to hold said UV lamp and one or more fans.

15. The system of claim 2 further comprising an automatic shut-off timer adapted to turn the system off after a predetermined time of no use of the system.

[16. A method of curing radiation curable coating compositions to form a cured coating layer on a vehicle body part comprising:

selecting a vehicle body part selecting a surface of said part to coat with a radiation curable coating;

preparing the surface to provide a prepared vehicle part surface;

applying at least one coating of radiation curable material to yield said prepared surface;

providing a handheld irradiator having a generally rectangular housing and defining a predetermined cure width, a lamp positioned within said housing, a reflector positioned within said housing and adapted to focus radiations out of one side of said housing and onto a band of a predetermined band width at a predetermined distance from said UV lamp, said lamp adapted to emit UV radiations and to emit visible radiations when said lamp is powered; activating said lamp; first moving said irradiator over said prepared surface area at a distance of approximately 2-4 inches from the prepared surface; second and subsequently moving said irradiator over said prepared surface at a distance of approximately 2-4 inches from the prepared surface and at about 50% of said cure width over the surface area just previously passed until the irradiator has been moved over all of said prepared surface of said vehicle body part; and, allowing the vehicle body part to cool down and cure for at least several seconds.]

* * * * *